United States Patent
Kawamoto et al.

(10) Patent No.: US 10,160,885 B2
(45) Date of Patent: Dec. 25, 2018

(54) HAND-TEARABLE DOUBLE-SIDED PRESSURE-SENSITIVE ADHESIVE TAPE

(71) Applicant: NITTO DENKO CORPORATION, Ibaraki-shi, Osaka (JP)

(72) Inventors: Takatoshi Kawamoto, Osaka (JP); Izumi Shimizu, Osaka (JP); Ikkou Hanaki, Osaka (JP); Kiichiro Matsushita, Osaka (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 36 days.

(21) Appl. No.: 15/501,486

(22) PCT Filed: Feb. 23, 2016

(86) PCT No.: PCT/JP2016/055193
§ 371 (c)(1),
(2) Date: Feb. 3, 2017

(87) PCT Pub. No.: WO2016/136717
PCT Pub. Date: Sep. 1, 2016

(65) Prior Publication Data
US 2017/0226384 A1    Aug. 10, 2017

(30) Foreign Application Priority Data

Feb. 27, 2015 (JP) .................. 2015-037819
Feb. 23, 2016 (JP) .................. 2016-031549

(51) Int. Cl.
*H01L 27/148* (2006.01)
*C09J 7/22* (2018.01)
(Continued)

(52) U.S. Cl.
CPC .. *C09J 7/22* (2018.01); *C09J 7/38* (2018.01); *C09J 133/066* (2013.01);
(Continued)

(58) Field of Classification Search
CPC ....................................... C09J 7/0275
(Continued)

(56) References Cited

FOREIGN PATENT DOCUMENTS

| JP | 2000-328013 A | 11/2000 |
|---|---|---|
| JP | 2002-105421 A | 4/2002 |

(Continued)

OTHER PUBLICATIONS

International Search Report of PCT/JP2016/055193, dated May 17, 2016. [PCT/ISA/210].

(Continued)

*Primary Examiner* — Brent T O'Hern
(74) *Attorney, Agent, or Firm* — Sughrue Mion, PLLC

(57) ABSTRACT

A double-sided pressure-sensitive adhesive tape includes a support base member having a hand tearable property, a first acrylic adhesive layer on one surface of the support base member, and a second acrylic adhesive layer on another surface of the support base member. The first acrylic adhesive layer has a thickness t1 that is 5 μm or more and 50 μm or less, the second acrylic adhesive layer has a thickness t2 that is greater than the thickness t1 of the first acrylic adhesive layer and is 20 μm or more, the second acrylic adhesive layer has gel fraction X2 that is 20 mass % or more and 75 mass % or less, and the second acrylic adhesive layer has adhesive force greater than adhesive force of the first acrylic adhesive layer.

17 Claims, 3 Drawing Sheets

(51) Int. Cl.
*C09J 7/38* (2018.01)
*C09J 133/06* (2006.01)

(52) U.S. Cl.
CPC .... *C09J 2201/134* (2013.01); *C09J 2201/606* (2013.01); *C09J 2201/622* (2013.01); *C09J 2423/046* (2013.01); *C09J 2433/00* (2013.01)

(58) Field of Classification Search
USPC .......................................................... 428/43
See application file for complete search history.

(56) References Cited

FOREIGN PATENT DOCUMENTS

| | | | |
|---|---|---|---|
| JP | 2004-189861 A | | 7/2004 |
| JP | 2005-089490 A | | 4/2005 |
| JP | 2013-023627 A | | 2/2013 |
| JP | 2014-091783 A | | 5/2014 |
| JP | 2014091783 A | * | 5/2014 |
| JP | 2015-048430 A | | 3/2015 |

OTHER PUBLICATIONS

Written Opinion of PCT/JP2016/055193, dated May 17, 2016. [PCT/ISA/237].

* cited by examiner

HAND-TEARABLE DOUBLE-SIDED PRESSURE-SENSITIVE ADHESIVE TAPE

CROSS REFERENCE TO RELATED APPLICATIONS

This application is a National Stage of International Application No. PCT/JP2016/055193 filed Feb. 23, 2016, claiming priorities based on Japanese Patent Application Nos. 2015-037819, filed Feb. 27, 2015, and 2016-031549, filed Feb. 23, 2016, the contents of all of which are incorporated herein by reference in their entirety.

TECHNICAL FIELD

The present disclosure relates to a hand-tearable double-sided pressure-sensitive adhesive tape.

BACKGROUND ART

In a building site, objects to be protected such as a floor or walls are covered with a curing member. A pressure-sensitive adhesive tape for curing is used for fixing the curing member to the objects to be protected (for example, referring Patent Document 1). As described in Patent Document 1, such a pressure-sensitive adhesive tape for curing is required to have a hand tearing property to be torn easily by user's hand.

The curing member is removed from the object to be protected at last and therefore, the adhesive is required not to remain on the object to be protected after peeling (a good peeling property).

RELATED ART DOCUMENT

Patent Document

Patent Document 1: Japanese Unexamined Patent Application Publication No. 2004-189861

Problems to be Solved

The pressure-sensitive adhesive tape for curing includes a double-sided pressure-sensitive adhesive tape having one adhesive surface that is adhered to the curing member and another adhesive surface that is adhered to the object to be protected. Such a double-sided pressure-sensitive adhesive tape for curing has different adhesive force on the adhesive surfaces such that the adhesive tape is surely removed from the object to be protected and adhered to the curing member when the curing member is removed from the object to be protected. Specifically, the adhesive surface that is adhered to the object to be protected has low adhesive force and the adhesive surface that is adhered to the curing member has great adhesive force.

The curing member may be reused for another curing. Therefore, if the adhesive tape that is used in the previous curing process remains on the curing member, the object to be protected may get dirty by the remaining adhesive tape. Therefore, in such a double-sided pressure-sensitive adhesive tape, both of the adhesive surface having low adhesive force and the adhesive surface having great adhesive force are required to have a good peeling property.

However, the double-sided pressure-sensitive adhesive tape for curing generally includes rubber-based adhesive as an adhesive. Therefore, a part of the adhesive may remain on adherend such as an object to be protected and a curing member (especially, adherend to which adhesive having great adhesive force is adhered). Namely, adhesive residual may be caused.

DISCLOSURE OF THE PRESENT INVENTION

An object of the present invention is to provide a hand-tearable double-sided pressure-sensitive adhesive tape that is less likely to cause adhesive residual.

Means for Solving the Problem

As a result of enthusiastic studies by the inventor of the present invention to achieve the above object, the inventor found the technology as described below. A double-sided pressure-sensitive adhesive tape includes a support base member having a hand tearable property, a first acrylic adhesive layer on a side of one surface of the support base member, and a second acrylic adhesive layer on a side of another surface of the support base member, and the first acrylic adhesive layer has a thickness $t1$ that is 5 μm or more and 50 μm or less, the second acrylic adhesive layer has a thickness $t2$ that is greater than the thickness $t1$ of the first acrylic adhesive layer and is 20 μm or more, the second acrylic adhesive layer has gel fraction $X2$ that is 20 mass % or more and 75 mass % or less, and the second acrylic adhesive layer has adhesive force greater than adhesive force of the first acrylic adhesive layer. Such a double-sided pressure-sensitive adhesive tape has a good hand tearing property and is less likely to cause adhesive residual.

In the double-sided pressure-sensitive adhesive tape, the first acrylic adhesive layer may have gel fraction $X1$ that is 35 mass % or more and 90 mass % or less.

In the double-sided pressure-sensitive adhesive tape, the gel fraction $X1$ of the first acrylic adhesive layer may be greater than the gel fraction $X2$ of the second acrylic adhesive layer.

In the double-sided pressure-sensitive adhesive tape, the support base member may have a thickness $t0$ that is 10 μm or more and 150 μm or less.

In the double-sided pressure-sensitive adhesive tape, the first acrylic adhesive layer and the second acrylic adhesive layer may include acrylic polymer and a crosslinking agent.

In the double-sided pressure-sensitive adhesive tape, the first acrylic adhesive layer and the second acrylic adhesive layer may include the crosslinking agent in 0.1 parts by mass or more and 5 parts by mass or less based on 100 parts by mass of acrylic polymer.

In the double-sided pressure-sensitive adhesive tape, the crosslinking agent may include isocyanate crosslinking agent or epoxy crosslinking agent.

In the double-sided pressure-sensitive adhesive tape, the first acrylic adhesive layer and the second acrylic adhesive layer may include tackifier in 2 parts by mass or more and 50 parts by mass or less based on 100 parts by mass of the acrylic polymer.

In the double-sided pressure-sensitive adhesive tape, the support base member may be made of a polyolefin resin film.

In the double-sided pressure-sensitive adhesive tape, the support base member may contain high density polyethylene and low density polyethylene as a composition of the polyolefin resin film.

In the double-sided pressure-sensitive adhesive tape, the support base member may be made of a uniaxially stretched type resin film or a resin film including a weak portion that is a tearing start portion.

In the double-sided pressure-sensitive adhesive tape, the support base member may include a recessed portion on at least one surface thereof as the weak portion.

In the double-sided pressure-sensitive adhesive tape, the thickness t2 of the second acrylic adhesive layer may be 50 µm or more.

The double-sided pressure-sensitive adhesive tape may be used for a curing member for construction.

In the double-sided pressure-sensitive adhesive tape, the acrylic adhesive layer may be adhered to an object to be covered and the second acrylic adhesive layer may be adhered to the curing member that covers the object to be covered.

Effects of the Invention

According to the present invention, a hand-tearable double-sided pressure-sensitive adhesive tape that is less likely to cause adhesive residual can be provided.

MODE FOR CARRYING OUT THE INVENTION

Detailed Description (Hand-Tearable Double-Sided Pressure-Sensitive Adhesive Tape)

A hand-tearable double-sided pressure-sensitive adhesive tape has a hand tearing property such that the tape can be cut by a user's hand and has two adhesive surfaces having different adhesive forces so as to be separated from an object to be adhered without causing adhesive residual. Such a hand-tearable double-sided pressure-sensitive adhesive tape includes a support base member having a hand tearing property, a first acrylic adhesive layer, and a second acrylic adhesive layer. The first acrylic adhesive layer is disposed on one surface side of the support base member and has a low adhesive force surface, and the second acrylic adhesive layer is disposed on another surface side of the support base member and has a great adhesive force surface. The first acrylic adhesive layer and the second acrylic adhesive layer have a hand tearing property to be cut by hands similar to the support base member.

Figure 1:
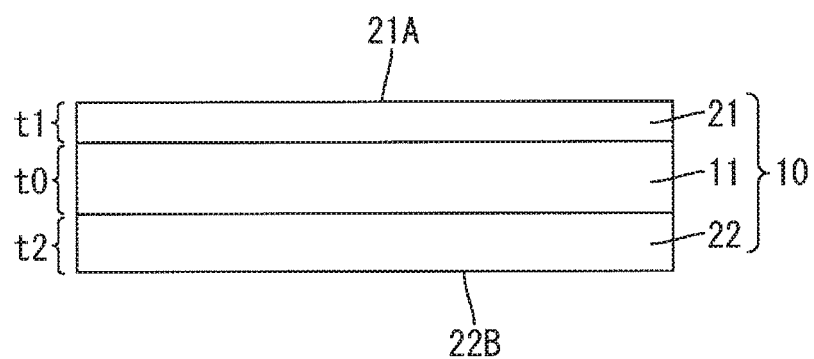
FIG. 1 is a typical view illustrating an example of a hand-tearable double-sided pressure-sensitive adhesive tape.

FIG. 1 is a typical view illustrating an example of a hand-tearable double-sided pressure-sensitive tape 10. As illustrated in FIG. 1, the hand-tearable double-sided pressure-sensitive tape 10 includes a support base member 11, a first acrylic adhesive layer 21, and a second acrylic adhesive layer 22. The first acrylic adhesive layer 21 is disposed on one surface side of the support base member 11 and has a low adhesive force surface 21A. The second acrylic adhesive layer 22 is disposed on another surface side of the support base member 11 and has a great adhesive force surface 22B.

The pressure-sensitive adhesive tape may also be referred to by a different name such as a pressure-sensitive adhesive sheet and a pressure-sensitive adhesive film. The term "pressure-sensitive adhesive tape" is used throughout this specification. A surface of the pressure-sensitive adhesive layer of the pressure-sensitive adhesive tape may be referred to as an "adhesive surface". An adhesive surface of the first acrylic adhesive layer may be referred to as a low adhesive force surface and an adhesive surface of the second acrylic adhesive layer may be referred to as a great adhesive force surface.

In this specification, the hand tearable property means as follows. A member (such as the support base member, or the hand-tearable double-sided pressure-sensitive tape) having rigidity (strength) that can keep a shape thereof is torn along a line in substantially one direction when external force is applied to the member to be torn by a user.

(Support Base Member)

The support base member has a hand tearing property so as to be torn along a line extending in at least one direction by a user's hand. The support base member having a hand tearing property includes a resin film having a weak portion (a hand tearable portion), a uniaxially stretched type resin film, a cloth made of textile (including resin cloth), and metal foil. Namely, means for providing the hand tearing property to the support base member is not restricted. The hand tearing property may be provided by including a weak portion (a recessed portion or perforation) or using a stretched direction of the resin film or using a direction of fibers included in the cloth (a warp direction, a woof direction). The support base member may be a single layer or may be composed of two or more layers.

(Resin Film Including Weak Portion)

The resin film including a weak portion includes a weak portion that is a starting point where tearing is started. The weak portion extends along a width of the resin film so as to cross an elongated (tape-shaped) resin film.

The weak portion is formed on the support base member and extends in a short-side direction (a width direction) of the hand-tearable double-sided pressure-sensitive tape (the support base member). The short-side direction is perpendicular to an elongated direction of the hand-tearable double-sided pressure-sensitive tape. The weak portions are formed and arranged in the elongated direction of the hand-tearable double-sided pressure-sensitive tape (the support base member) at an equal interval or appropriate intervals. The interval between the weak portions is determined such that a user (an operator) can easily cut the hand-tearable double-sided pressure-sensitive tape with his/her hand at a desired part.

The weak portion of the resin film has strength smaller than that of other portions. The weak portion may be a recessed portion such as a groove formed in at least one surface of the resin film (the support base member) to extend in the width direction. Unevenness is processed on the resin film that configures the support base member and the resin film includes a thin portion (a recessed portion). The thin portion (the recessed portion) is used as the weak portion.

To provide unevenness on the resin film, an embossing roll having unevenness on a surface thereof (projections for forming the weak portions) may be in contact with a surface of the resin film that is just formed and the uneven shape (recessed portions) is transferred to the surface of the resin film. Specifically, means described in Japanese Unexamined Patent Application Publication No. 3-47885 may be used.

Figure 2:
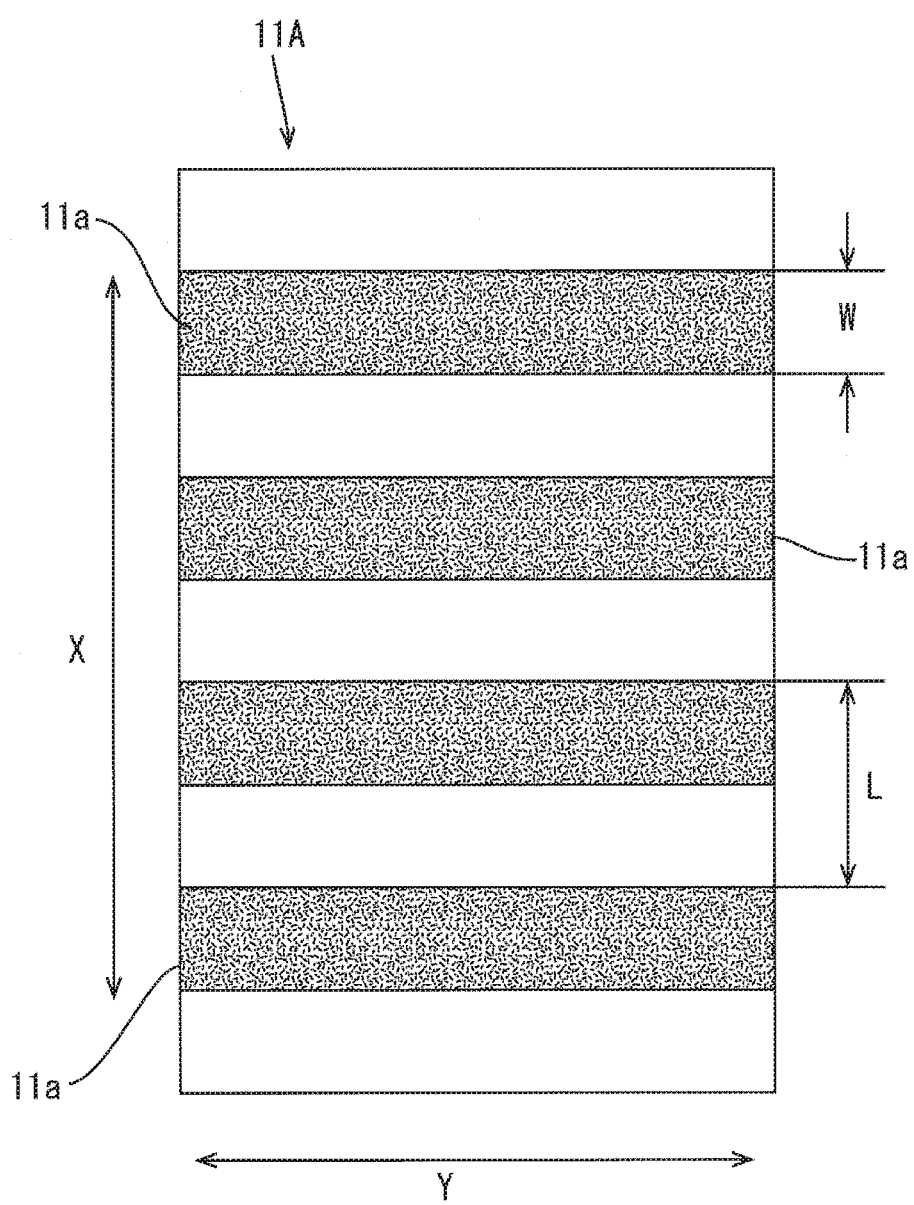
FIG. 2 is an upper view illustrating a part of an example of a resin film including recessed portions.
Figure 3:
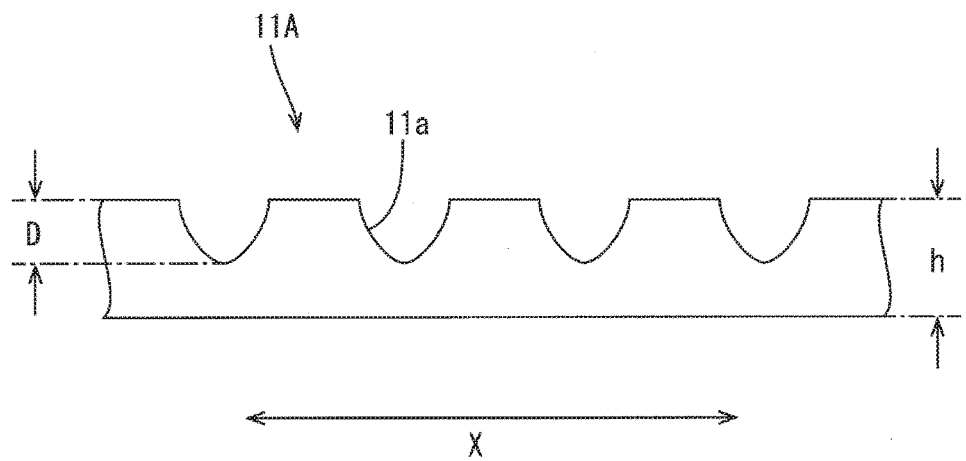
FIG. 3 is a cross-sectional view illustrating a part of the resin film including the recessed portions taken along a longitudinal direction.

With reference to FIGS. 2 and 3, a resin film including recessed portions 11A will be described as an example of the resin film including the weak portions. FIG. 2 is a general upper view illustrating a part of the resin film including recessed portions 11A, and FIG. 3 is a general cross-sectional view illustrating a part of the resin film including recessed portions 11A taken along the elongated direction. In FIGS. 2 and 3, the symbol 11A represents the resin film including recessed portions and the symbol 11a represents the recessed portions (the weak portions). The symbol W represents a width of the recessed portion, the symbol L represents an interval between the recessed portions, the symbol D represents a width (a maximum depth) of the recessed portion, and the symbol h represents a thickness (a maximum thickness) of the resin film including recessed portions 11A. The symbol X represents a length direction of the resin film including recessed portions 11A, and the symbol Y represents a width direction of the resin film including recessed portions 11A.

As illustrated in FIGS. 2 and 3, the resin film including recessed portions 11A includes the recessed portions 11a in one surface thereof and the recessed portions 11a are arranged parallel to each other. No recessed portion 11a is formed in another surface of the resin film including recessed portions 11A and the other surface is a flat surface. The recessed portion 11a is an elongated groove extending straight along the width direction of the elongated (tape-shaped) resin film. The recessed portion 11a has a constant width (groove width) and the interval between the recessed portions 11a is constant. The recessed portion 11a has a curved bottom surface.

Figure 4:
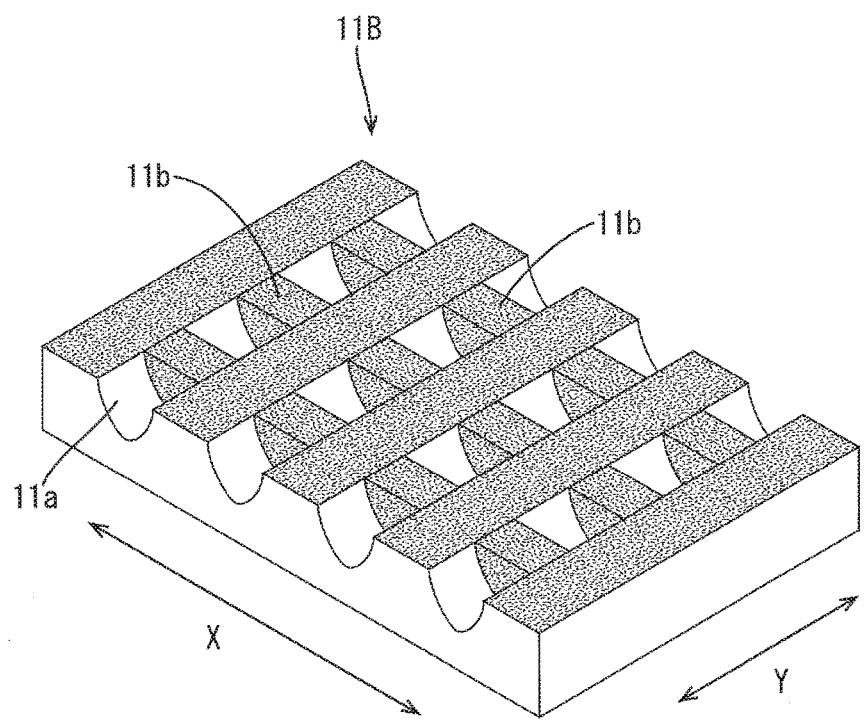
FIG. 4 is a cross-sectional view illustrating a part of another example of a resin film including recessed portions.

As illustrated in FIG. 4, a resin film including recessed portions 11B having ribs in the recessed portions may be used as the support base member. FIG. 4 is a general cross-sectional view illustrating a part of the resin film including recessed portions 11B. In FIG. 4, the symbol 11B represents the resin film including recessed portions, the symbol 11a represents the recessed portions (the weak portions), and the symbol 11b represents the ribs. The symbol X represents a length direction of the resin film including recessed portions 11B, and the symbol Y represents a width direction of the resin film including recessed portions 11B. As illustrated in FIG. 4, the resin film including recessed portions 11B including the ribs 11b extending in a direction crossing the recessed portions 11a may be used as the support base member.

The depth of the recessed portions 11a included in the resin film including recessed portions 11A, 11B is not particularly limited but a lower limit value of the depth is preferably 20% or more of the thickness of the resin film including recessed portions (maximum thickness: 100%). An upper limit value of the depth of the recessed portions 11a is preferably 80% or less of the thickness of the resin film including recessed portions 11A, 11B (maximum thickness: 100%), and more preferably 50% or less of the same. The hand-tearable double-sided pressure-sensitive tape including the recessed portion with the depth within such a range can have a good hand tearing property without lowering strength thereof in the elongated direction.

The maximum width of the recessed portion 11a is not particularly limited but a lower limit value thereof is preferably 50 µm or more and an upper limit value thereof is preferably 500 µm or less, more preferably 300 µm or less, further more preferably 200 µm or less. The maximum width of the recessed portion 11a is a maximum width in the elongated direction (the elongated direction of the resin film, a direction perpendicular to the extending direction of the recessed portion 11a) of the one recessed portion 11a in the surface of the resin film including recessed portions 11A, 11B. The hand-tearable double-sided pressure-sensitive tape including the recessed portion 11a with the maximum width within such a range can have a good processing property without deteriorating a hand tearing property or mechanical strength thereof.

In the resin film having recessed portions 11B, the ribs 11b configure a support member that seems to extend in the elongated direction of the resin film having recessed portions 11b and a part of the recessed portion 11b is filled with the ribs 11b. With such ribs 11b, when external force acts on the resin film 11B having recessed portions 11, the recessed portions 11a are less likely to be deformed and the hand tearing property of the resin film 11B having recessed portions are less likely to be deteriorated due to the deformation of the recessed portions 11a. If the hand-tearable double-sided pressure-sensitive tape is stored with being wound, the hand-tearable double-sided pressure-sensitive adhesive tape including the recessed portions 11a with the ribs 11b can be easily wound.

A width of the rib 11b is not particularly limited but a lower limit value thereof is preferably 50 µm or more and an upper limit value thereof is preferably 500 µm or less, and more preferably 200 µm or less from a viewpoint of ensuring the good hand tearing property. The number of the ribs included in one recessed portion (number of ribs/cm) is not particularly limited but a lower limit value thereof is preferably 20 ribs/cm or more from a viewpoint of ensuring the good hand tearing property. An upper limit value of the number of ribs included in one recessed portion 11a (number of ribs/cm) is preferably 100 ribs/cm or less, and more preferably 50 ribs/cm or less.

A distance between adjacent ribs (a smallest distance between the adjacent ribs in the width direction of the resin film having recessed portions 11B) is not particularly limited but a lower limit value thereof is preferably 100 µm or more, and more preferably 200 µm or more. An upper limit value of the distance between adjacent ribs (a smallest distance between the adjacent ribs in the width direction of the support base member having recessed portions) is preferably 500 µm or less.

The resin film having recessed portions 11A, 11B has the recessed portions 11a at least in one surface thereof. Namely, the resin film having recessed portions 11A, 11B may have the recessed portions 11a only in one surface thereof but may have the recessed portions 11a in two surfaces thereof. The resin film having recessed portions 11A, 11B preferably has the recessed portions 11a only in one surface thereof from a viewpoint of ensuring strength. The resin film having recessed portions 11A, 11B having the recessed portions 11a only in one surface thereof preferably includes the first acrylic adhesive layer on the one surface having the recessed portions 11a. The first acrylic adhesive layer has a low adhesive force and the lowering of the adhesive force due to the shape of the recessed portions 11a is not substantially a serious problem.

In the resin film having recessed portions, one recessed portion has a shape extending in the width direction of the film (a direction perpendicular to the longitudinal direction) and the recessed portion preferably extends in the width direction crossing the resin film from one edge to another edge with respect to the width direction.

A shape of the recessed portion is not particularly limited but may be a straight linear shape, a zigzag shape, a wavelike shape, or a curved shape. The recessed portion preferably has a straight linear shape from a viewpoint of ensuring a good appearance of a torn portion and ensuring the hand tearing property.

The interval between the recessed portions 11a is not particularly limited but a lower limit value thereof is preferably 100 μm or more, and more preferably 500 μm or more. An upper limit value of the interval between the recessed portions 11a is preferably 4000 μm or less, and more preferably 3000 μm or less, and particularly preferably 2000 μm or less. The hand-tearable double-sided pressure-sensitive tape (the support base member) including the recessed portion 11a with the interval within such a range can reduce a cutting area and can be torn along the recessed portion 11a and the hand tearing property can be ensured.

The number of the recessed portions 11a (number of recessed portions/m) in the surface (one surface) of the resin film having recessed portions 11A, 11B is not particularly limited but a lower limit value thereof is preferably 200 recessed portions/m or more, and more preferably 500 recessed portions/m or more. An upper limit value of the number of recessed portions (number of recessed portions/m) is preferably 2000 recessed portions/m or less, and more preferably 1500 recessed portions/m or less. The number of recessed portions 11a (number of recessed portions/m) represents the number of recessed portions 11a, which extends in the width direction of the resin film having recessed portions 11A, 11B, in a one-meter length area of the surface of the resin film having recessed portions 11A, 11B in the elongated direction of the resin film having recessed portions 11A, 11B (the direction perpendicular to the extending direction of the recessed portion 11a).

A thickness (a whole thickness, a maximum thickness) of the resin film having recessed portions 11A, 11B is not particularly limited but a lower limit value thereof is preferably 10 μm or more, and more preferably 50 μm or more. An upper limit value of the thickness (a whole thickness, a maximum thickness) of the resin film having recessed portions 11A, 11B is preferably 150 μm or less, and more preferably 100 μm or less. The hand-tearable double-sided pressure-sensitive tape including the resin film having recessed portions 11A, 11B with the thickness within such a range can obtain effective mechanical strength with having a good hand tearing property.

The resin film having recessed portions 11A, 11B preferably has a thickness of 10 μm or more and 150 μm or less and includes the recessed portion having a depth that is 20% or more and 80% or less of the thickness thereof.

The resin film included in the resin film having recessed portions 11A, 11B as the support base member is not particularly limited but may preferably be a film of polyolefin-based resin (a polyolefin-based resin film) from a viewpoint of low cost and easy processing of the weak portions with unevenness processing.

Examples of polyolefin-based resin include polyethylene such as low density polyethylene, medium density polyethylene, high density polyethylene, and linear low density polyethylene. Examples of polyolefin-based resin further include polypropylene, polyvinyl chloride, polyvinylidene chloride, polyvinyl acetate, polystyrene, polyacetal, ethylene-α-olefin copolymer such as ethylene propylene copolymer, ethylene-butene copolymer, ethylene-pentene copolymer, ethylene-hexene copolymer, ethylene-heptene copolymer and ethylene-octene, copolymer, and ethylene-vinyl acetate-vinyl chloride copolymer, and ethylene-vinyl chloride copolymer. The polyolefin-based resin can be used alone or in combination of two or more kinds. Examples of the polyolefin-based resin mainly containing polyethylene (specifically, containing only polyethylene) or obtained by mixing polypropylene with polyethylene are preferably used from a viewpoint of good operability. A preferable example of the polyolefin-based resin mainly containing polyethylene is a mixture of the low density polyethylene and the high density polyethylene.

The resin film may contain resin composition other than polyolefin-based resin (for example, polyester-based resin, nylon-based resin).

The polyolefin-based resin is included in the composition of the resin film in an amount of 50% by mass or more (a lower limit value of a content rate), preferably 80% by mass or more, and more preferably 90% by mass or more. The polyolefin-based resin is included in the support base member in an amount of 100% by mass or less (an upper limit value of a content rate), preferably 99% by mass or less, and more preferably 98% by mass or less. The support base member (hand-tearable double-sided pressure-sensitive adhesive tape) containing polyolefin-based resin within such a range can ensure strength of the support base member (hand-tearable double-sided pressure-sensitive adhesive tape) and also ensure the hand tearing property of the support base member (hand-tearable double-sided pressure-sensitive adhesive tape).

The support base member may include additives such as pigments, ultraviolet ray absorbing agents, or lubricant as long as the object of the present invention is achieved.

Examples of the pigment include organic pigment such as acrylic pigment, azo pigment, poly-azo pigment, anthraquinone pigment, quinacridone pigment, isoindoline pigment, isoindolinone pigment, phthalocyanine pigment, perylene pigment, DPP pigment, fluorescent pigment, and condensed polycyclic pigment; and inorganic pigment such as carbon black, synthetic silica, chromium oxide, iron oxide, titanium oxide, zinc sulfide, calcined pigment, and natural mica. The pigment can be used alone or in combination of two or more kinds.

Examples of the ultraviolet ray absorbing agents include benzophenone-based ultraviolet ray absorbing agent, malonic acid ester-based ultraviolet ray absorbing agent, aromatic hindered amine-based ultraviolet ray absorbing agent, oxalic anilide-based ultraviolet ray absorbing agent, and benzotriazole-based ultraviolet ray absorbing agent. The ultraviolet ray absorbing agent can be used alone or in combination of two or more kinds.

As a method of manufacturing the resin film of the support base member, for example, polyolefin-based resin is mixed with the additives such as the pigment and lubricant and the obtained mixture is molded into a film with using a known film forming method such as T-die press molding or calendar molding.

One or both of two surfaces of the support base member may be subjected to the surface treatment such as a sputtering treatment, corona (discharge) treatment, flame treatment, ultraviolet rays irradiation treatment, and electron beam irradiation treatment.

The weak portion may be the recessed portion (a thin portion) formed in the resin film with the unevenness processing or may be a through hole through the thickness of the resin film. For example, holes (a column of holes) that are arranged in a column may be used as the weak portion for the recessed portions of grooves. The weak portion may have a continuous form or may have a broken form (so-called perforation).

(Uniaxially Stretched Type Resin Film)

The above resin film that is uniaxially stretched is an example of a uniaxially stretched type resin film. The resin film (the support base member) that is subjected to uniaxially stretching such as lengthwise uniaxial stretching or transverse uniaxial stretching is easily cut along the stretched direction. Such a uniaxially stretched type resin film may be used as the support base member.

The resin film used for the uniaxially stretched type resin film may preferably be a mixture of high density polyethylene and low density polyethylene. A mixing ratio of high density polyethylene and low density polyethylene is not particularly limited and for example, 1 to 25 parts by mass of low density polyethylene is mixed with 100 parts by mass of high density polyethylene.

Other components such as pigment, dye, antioxidant, and ultraviolet ray absorbing agent may be added to the resin film for the uniaxially stretched resin film other than the resin component such as polyethylene.

A method of manufacturing the uniaxially stretched resin film is not particularly limited but may be a known method. The stretch ratio of the film is not particularly limited as long as the object of the present invention is achieved, and may be 6 to 16 times, for example.

The uniaxially stretched resin film may be stretched in a direction other than the direction that ensures the hand tearing property as long as the object of the present invention is achieved.

The thickness of the support base member (a lower limit value) is not particularly limited as long as the object of the present invention is achieved. The thickness of the support base member is preferably 20 μm or more, and more preferably 25 μm or more. The thickness of the support member (an upper limit value) is not particularly limited as long as the object of the present invention is achieved. The thickness of the support base member is preferably 150 μm or less, and more preferably 130 μm or less, much more preferably 100 μm or less.

The support base member has a thickness within such a range ensures strength of the support base member (the hand-tearable double-sided pressure-sensitive tape) and also ensures the hand tearing property of the support base member (the hand-tearable double-sided pressure-sensitive tape). The thickness of the support base member is a thickness of a flat portion thereof where no weak portion is formed (a whole thickness, a maximum thickness).

The resin film including weak portions such as the resin film having recessed portion or the uniaxially stretched resin film is preferably used as the support base member because no lint is generated in cutting.

(First Acrylic-Based Adhesive Layer)

The first acrylic adhesive layer has adhesive force smaller than that of the second acrylic adhesive layer and provides a low adhesive force surface of the hand-tearable double-sided pressure-sensitive tape. The first acrylic adhesive layer preferably contains acrylic polymer a1 and crosslinking agent. The first acrylic adhesive layer may contain tackifier resin or other components as necessary.

The first acrylic adhesive layer is not particularly limited but an example of the first acrylic adhesive layer may be an acrylic adhesive layer made of an adhesive agent composition containing acrylic polymer and crosslinking agent and other component such as tackifier resin as necessary as long as the object of the present invention is achieved.

(Acrylic Polymer a1)

Acrylic polymer a1 is used as adhesive base polymer in the first acrylic adhesive layer and is a polymer containing alkyl(meth)acrylate as a main monomer. The acrylic polymer a1 may contain a carboxyl group-containing monomer or a hydroxyl group-containing monomer as a copolymer monomer component. The acrylic polymer a1 may contain another monomer component as necessary. The term "(meth)acrylic" refers to "acrylic" and/or "methacrylic," (one of or both of "acrylic" and "methacrylic") and the same is true for other descriptions.

Examples of alkyl(meth)acrylate are not particularly limited as long as alkyl(meth)acrylate has alkyl group with a carbon number of 1 to 12. Examples of the alkyl(meth) acrylates include methyl(meth)acrylates, ethyl(meth)acrylates, n-propyl(meth)acrylates, isopropyl(meth)acrylates, n-butyl(meth)acrylates, isobutyl(meth)acrylates, sec-butyl (meth)acrylates, t-butyl(meth)acrylates, pentyl(meth)acrylates, isopentyl(meth)acrylates, neopentyl(meth)acrylates, hexyl(meth)acrylates, heptyl(meth)acrylates, octyl(meth) acrylates, isooctyl(meth)acrylates, 2-ethylhexyl(meth)acrylates, nonyl(meth)acrylates, isononyl(meth)acrylates, decyl (meth)acrylates, isodecyl(meth)acrylates, undecyl(meth) acrylates, and dodecyl(meth)acrylates.

Among the above alkyl(meth)acrylate, alkyl(meth)acrylate containing alkyl group with a carbon number of 4 to 12 is preferable and 2-ethylhexyl(meth)acrylates (2EHA), n-butyl(meth)acrylates (BA) are particularly preferable.

The alkyl(meth)acrylate can be used alone or in combination of two or more kinds.

The alkyl(meth)acrylate is included in the acrylic polymer a1 as a monomer unit (a lower limit value) in 85% by mass or more, preferably 88% by mass or more, and more preferably 90% by mass or more. The alkyl(meth)acrylate is included in the acrylic polymer as a monomer unit (an upper limit value) in 99% by mass or less.

Examples of the carboxyl group-containing monomers include (meth)acrylic acids, itaconic acid, maleic acid, fumaric acid, crotonic acid, and isocrotonic acid. Acid anhydrides of the carboxyl group-containing monomers (monomers containing acid anhydride group such as maleic anhydride and itaconic anhydride) may be used as the carboxyl group-containing monomers. The monomer components can be used alone or in combination of two or more kinds.

The carboxyl group-containing monomer is included in the acrylic polymer a1 as a monomer unit (a lower limit value) in 1% by mass or more. The carboxyl group-containing monomer is included in the acrylic polymer a1 as a monomer unit (an upper limit value) in 10% by mass or less, more preferably 8% by mass or less, and further more preferably 5% by mass or less.

Examples of the hydroxyl group-containing monomers include 2-hydroxyethyl (meth)acrylate, 3-hydroxypropyl (meth)acrylate, 4-hydroxybutyl (meth)acrylate, 6-hydroxyhexyl (meth)acrylate, vinyl alcohol, and allyl alcohol. The hydroxyl group-containing monomers can be used alone or in combination of two or more kinds. Among the above hydroxyl group-containing monomers, 2-hydroxyethyl (meth)acrylate is preferable.

The hydroxyl group-containing monomer is included in the acrylic polymer a1 as a monomer unit (a lower limit value) preferably in 0.01% by mass or more. The hydroxyl group-containing monomer is included in the acrylic polymer a1 as a monomer unit (an upper limit value) preferably in 2% by mass or less, more preferably 1% by mass or less, and further more preferably 0.5% by mass or less.

Examples of the other copolymer monomers include silyl group-containing monomers such as 3-methacryloxypropyl trimethoxy silane, amide group-containing monomers such as (meth)acrylamide, N,N-dimethyl(meth)acrylamide, N-methylol(meth)acrylamide, N-methoxymethyl(meth) acrylamide, N-butoxymethyl(meth)acrylamide, and N-hydroxyethylacrylamide; amino group-containing monomers such as aminoethyl(meth)acrylate, dimethylaminoethyl (meth)acrylate, and t-butylaminoethyl(meth)acrylate; epoxy group-containing monomers such as glycidyl (meth)acrylate, methylglycidyl(meth)acrylate; cyano-containing monomers such as acrylonitrile, methacrylonitrile; heterocyclic vinyl monomers such as N-vinyl-2-pyrolidone, (meth)acryloylmorpholine, N-vinylpiperidone, N-vinylpiperazine, N-vinylpyrrole, and N-vinylimidazole; sulfonic acid-containing monomer such as vinyl sodium sulfonate; phosphate group-containing monomer such as 2-hydroxyethyl acryloylphophate; imide group-containing monomers such as cyclohexylmaleimide, isopropylmaleimide; isocyanate group-containing monomers such as 2-methacryloyloxyethyl isocyanate; alkoxyalkyl ester(meth)acrylate such as methoxyethyl(meth)acrylate, ethoxyethyl (meth)acrylate; polyfunctional monomers such as triethylene glycol diacrylate, ethylene glycol dimethacrylate, trimethylolpropane tri (meth)acrylate; vinyl ester-based monomers such as vinyl acetate, vinyl propionate; olefin-based monomers such as ethylene, propylene, isoprene, butadiene; and vinyl ether-based monomers such as vinyl ether. The monomers can be used alone or in combination of two or more kinds.

The other copolymer monomers may be included in the acrylic polymer a1 as a monomer unit preferably in 10% by mass or less.

The content amount (a lower limit value) of the acrylic polymer a1 in the adhesive base polymer of the first acrylic adhesive layer is preferably 50% by mass or more, more preferably 70% by mass or more, and further more preferably 90% by mass or more. The content amount (an upper limit value) of the acrylic polymer a1 in the adhesive base polymer of the first acrylic adhesive layer is preferably 100% by mass or less.

The base polymers other than the acrylic polymer a1 may be used as the base polymer in the first acrylic adhesive layer as long as the object of the present invention is achieved.

The acrylic polymer a1 can be produced by a known polymerization method. Examples of the polymerization method include solution polymerization, emulsion polymerization, mass polymerization, and photopolymerization.

A polymerization initiator and a chain transfer agent used in the polymerization of the acrylic polymer a1 are not particularly limited but may be selected from the known materials.

Examples of the polymerization initiators are oil-soluble polymerization initiators including azo initiators such as 2,2'-azobisisobutyronitrile, 2,2'-azobis(4-methoxy-2,4-dimethyl-valeronitrile), 2,2'-azobis(2,4-dimethyl-valeronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methyl propionate); and peroxide polymerization initiators such as benzoyl peroxide, t-butyl hydroperoxide, di-t-butyl peroxide, t-butyl peroxybenzoate, dicumyl peroxide, 1,1-bis(t-butyl peroxy)3,3,5-trimethylcyclohexane, 1,1-bis(t-butyl peroxy) cyclododecane. The polymerization initiators can be used alone or in combination of two or more kinds. The amount of the polymerization initiator is 0.01 to 1 parts by mass based on 100 parts by mass of the total monomer components.

Examples of the chain transfer agents include lauryl mercaptan, glycidyl mercaptan, mercaptoacetic acid, 2-mercaptoethanol, thioglycollic acid thioglycollic acid 2-ethylhexyl, 2,3-dimercaptan-1-propanol. The chain transfer agents can be used alone or in combination of two or more kinds.

Solvents used in the polymerization of the acrylic polymer a1 can be known solvents. Examples of the solvents are organic solvents including: ester solvents such as ethyl acetate and n-butyl acetate; aromatic hydrocarbon solvents such as toluene and benzene; aliphatic hydrocarbon solvents such as n-hexane, n-heptane; alicyclic hydrocarbon solvents such as cyclohexane, methyl cyclohexane; ketone solvents such as methyl ethyl ketone, methyl isobutyl ketone. The solvents can be used alone or in combination of two or more kinds.

The weight-average molecular weight (Mw) of the acrylic polymers a1 is not particularly limited but a lower limit value of the weight-average molecular weight (Mw) is preferably 300,000 or more, and more preferably 350,000 or more, and further more preferably 400,000 or more from a viewpoint of s coating property of the solution containing the acrylic polymer a1. An upper limit value of the weight-average molecular weight (Mw) is preferably 2,000,000 or less, and more preferably 1,900,000 or less, and further more preferably 1,800,000 or less. The above weight-average molecular weight of the acrylic polymer a1 can be controlled by changing and adjusting types and amounts of the polymerization initiators, and polymerizing conditions such as temperature and duration of polymerization process. The weight-average molecular weight (Mw) of the acrylic polymer a1 is measured by gel permeation chromatography (GPC).

The first acrylic adhesive layer may contain tackifier resin as a component other than the base polymer such as the acrylic polymer a1. Examples of the tackifier resin include terpene-based tackifier resin, phenol-based tackifier resin, rosin-based tackifier resin, petroleum-based tackifier resin. Rosin-based tackifier resin is particularly preferable as the tackifier resin. The tackifier resin can be used alone or in combination of two or more kinds.

Examples of the terpene-based tackifier resin include terpene-based resin such as α-pinene-based polymer, β-pinene-based polymer, dipentene polymer, and modified terpene resin that is obtained by modifying the terpene-based resin (with phenol modification, aromatic modification, hydrogenation modification, hydrocarbon modification). The modified terpene resin includes terpene phenol-based resin, styrene modified terpene-based resin, aromatic modification terpene-based resin, hydrogenation terpene-based resin.

Examples of the phenol-based tackifier resin include condensate (for example, alkyl phenol-based resin, xylene-formaldehyde resin) of phenol (such as phenol, m-cresol, 3,5-xyleneol, p-alkyl phenol, resorcin) and formaldehyde, resol obtained from the phenol and formaldehyde by addition reaction with using alkali catalyst, novolak obtained from the phenol and formaldehyde by condensation reaction with using acid catalyst, and rosin modified phenol resin obtained by adding the phenol to the rosin (unmodified rosin, modified rosin, various rosin derivative) using acid catalyst through thermal polymerization.

Examples of the rosin-based tackifier resin include unmodified rosin (raw rosin), modified rosin obtained by modifying the unmodified rosin with hydrogenation, disproportionation, polymerization, and various rosin derivatives. Examples of the unmodified rosin include gum rosin, wood rosin, tall oil rosin. Examples of the modified rosin include hydrogenated rosin, disproportionation rosin, polymerized rosin, and chemically modified rosin. Examples of rosin derivatives include rosin ester, unsaturated fatty acid modified rosin, unsaturated fatty acid modified rosin ester, rosin alcohol, and metal salt of rosin (particularly rosin ester) such as the unmodified rosin, the modified rosin, the various rosin derivatives. Examples of rosin ester include ester compound of rosin obtained from unmodified rosin being subjected to esterification with alcohol, and ester compound of modified rosin obtained from the modified rosin being subjected to esterification with alcohol. Examples of the modified rosin include hydrogenated rosin, disproportionation rosin, and polymerized rosin. The unsaturated fatty acid modified rosin is obtained by modifying the unmodified rosin or the modified rosin (hydrogenated rosin, disproportionation rosin, and polymerized rosin) with unsaturated fatty acid. The unsaturated fatty acid modified rosin ester is obtained by modifying the rosin ester with unsaturated fatty acid. The rosin alcohol is obtained by performing reduction treatment to the carboxyl group contained in the unmodified rosin, the modified rosin (hydrogenated rosin, disproportionation rosin, and polymerized rosin), the unsaturated fatty acid modified rosin, and the unsaturated fatty acid modified rosin ester.

Examples of the petroleum-based tackifier resin include known petroleum resin such as aromatic petroleum resin, aliphatic petroleum resin, alicyclic petroleum resin (cycloaliphatic petroleum resin), aliphatic/aromatic petroleum resin, aliphatic/alicyclic petroleum resin, hydrogenated petroleum resin, coumarone resin, and coumarone-indene resin.

The content amount (a lower limit value) of the tackifier resin is preferably 3 parts by mass or more, more preferably 5 parts by mass or more based on 100 parts by mass of the solid content of the adhesive base polymer (such as acrylic polymer a1) in the adhesive agent composition for forming the first acrylic adhesive layer. The content amount (an upper limit value) of the tackifier resin is preferably 50 parts by mass or less, more preferably 40 parts by mass or less based on 100 parts by mass of the solid content of the adhesive base polymer (such as acrylic polymer a1) in the adhesive agent composition for forming the first acrylic adhesive layer. The first acrylic adhesive layer containing the tackifier resin within such a range has effective adhesive force.

Examples of the crosslinking agents include, for example, isocyanate crosslinking agents, epoxy crosslinking agents, melamine crosslinking agents, peroxide crosslinking agents, urea crosslinking agents, metal alkoxide crosslinking agents, metal chelate crosslinking agents, metal salt crosslinking agents, carbodiimide crosslinking agents, oxazoline crosslinking agents, aziridine crosslinking agents, and amine crosslinking agents. The isocyanate crosslinking agents and the epoxy crosslinking agents are preferable. The crosslinking agents can be included alone or in combination of two or more kinds.

Examples of the isocyanate crosslinking agents include: lower aliphatic polyisocyanates such as 1,2-ethylene diisocyanate, 1,4-butylene diisocyanate, and 1,6-hexamethylene diisocyanate; alicyclic polyisocyanates such as cyclopentylene diisocyanate, cyclohexylene diisocyanate, isophorone diisocyanate, hydrogenated tolylene diisocyanate, hydrogenated xylene diisocyanate, and hydrogenated xylylene diisocyanate; aromatic polyisocyanates such as 2,4-tolylene diisocyanate, 2-6-tolylen diisocyanate, 4,4'-diphenylmethane diisocyanate, and xylylene diisocyanate, trimethylolpropane/tolylene diisocyanate 3 adduct (available from Nippon Polyurethane Industry Co., Ltd. under the trade name CORONATE L) and trimethylolpropane/hexamethylene diisocyanate 3 adduct (available from Nippon Polyurethane Industry Co., Ltd. under the trade name CORONATE HL).

Examples of the epoxy cross-linking agents include: N,N,N',N'-tetraglycidyl-m-xylene diamine, diglycidylaniline, 1,3-bis(N,N-glycidylaminomethyl)cyclohexane, 1,6-hexanediol glycidyl ether, neopentyl glycol diglycidyl ether, ethylene glycol diglycidyl ether, propylene glycol diglycidyl ether, polyethylene glycol diglycidyl ethers, polypropylene glycol diglycidyl ethers, sorbitol polyglycidyl ethers, glycerol polyglycidyl ethers, pentaerythritol polyglycidyl ethers, polyglycerol polyglycidyl ethers, sorbitan polyglycidyl ethers, trimethylolpropane polyglycidyl ethers, adipic acid diglycidyl ester, o-phthalic acid diglycidyl ester, triglycidyl-tris(2-hydroxyethyl)isocyanurate, resorcin diglycidyl ether, and bisphenol-S-diglycidyl ether. In addition to the above, examples of the epoxy cross-linking agents include epoxy resins each having two or more epoxy groups per molecule.

The amount (a lower limit value) of the cross-linking agents is not particularly limited but may be preferably 0.1 parts by mass or more based on 100 parts by mass of the solid content of the adhesive base polymer (such as acrylic polymer a1) in the adhesive composition for forming the first acrylic adhesive layer. The amount (an upper limit value) of the cross-linking agents is not particularly limited but is preferably 4 parts by mass or less, more preferably 3.5 parts by mass or less, further more preferably 3.0 parts by mass or less, and particularly preferably 2.5 parts by mass or less based on 100 parts by mass of the solid content of the adhesive base polymer (such as acrylic polymer a1) in the adhesive composition for forming the first acrylic adhesive layer. The first acrylic adhesive layer containing the cross-linking agent within such a range has effective adhesive force, a good hand tearing property and a good peeling property.

The first acrylic adhesive layer may include known additives as necessary as long as the object of the present invention can be achieved. Examples of the additives includes age inhibitors, colorants (such as pigments and dyes), ultraviolet ray absorbing agents, antioxidants, plasticizing agents, softeners, surfactants, and fillers.

The composition such as the adhesive base polymer for forming the first acrylic adhesive layer may be used as a solution having viscosity that is adjusted as appropriate by general solvents. Examples of the solvents are organic solvents including: ester solvents such as ethyl acetate and n-butyl acetate; aromatic hydrocarbon solvents such as toluene and benzene; aliphatic hydrocarbon solvents such as n-hexane, n-heptane; alicyclic hydrocarbon solvents such as cyclohexane, methyl cyclohexane; and ketone solvents such as methyl ethyl ketone, methyl isobutyl ketone. The solvents can be used alone or in combination of two or more kinds.

(Gel Fraction X1 of First Acrylic Adhesive Layer)

A lower limit value of the gel fraction (ratio of solvent-insoluble components) X1 of the first acrylic adhesive layer is preferably 35 mass % or more, and more preferably 40 mass % or more. An upper limit value of the gel fraction (ratio of solvent-insoluble components) X1 is preferably 90 mass % or less, and more preferably 87 mass % or less. The first acrylic adhesive layer having the gel fraction (the upper limit value and lower limit value) of such a range has a good peeling property (adhesive residual property), a good hand tearing property, and effective adhesive force. A method of measuring gel fraction will be described later.

(Thickness t1 of First Acrylic Adhesive Layer)

A thickness of the first acrylic adhesive layer (a lower limit value) is 5 μm or more, and preferably 10 μm or more. A thickness of the first acrylic adhesive layer (an upper limit value) is 50 μm or less. The hand-tearable double-sided pressure-sensitive tape having the thickness of the first acrylic adhesive layer within such a range has a good peeling property (adhesive residual property), effective adhesive force, and a good hand tearing property.

(Second Acrylic Adhesive Layer)

The second acrylic adhesive layer has adhesive force greater than that of the first acrylic adhesive layer and provides the great adhesive force surface of the hand-tearing double-sided pressure-sensitive tape. The second acrylic adhesive layer at least includes acrylic polymer a2. The second acrylic adhesive layer may contain other components such as the crosslinking agents, and tackifier resin as necessary.

The second acrylic adhesive layer is not particularly limited but may comprise an adhesive composition including the acrylic polymer a2 and the crosslinking agents and further including other component such as the tackifier resin as necessary as long as the object of the present invention is achieved.

(Acrylic Polymer a2)

The acrylic polymer a2 is used as an adhesive base polymer in the second acrylic adhesive layer and is a polymer containing alkyl(meth)acrylate as a main monomer component (main monomer). The acrylic polymer a2 may further contain, where necessary, a carboxyl group-containing monomer or a hydroxyl group-containing monomer as a copolymer monomer component other than the monomer main component.

The alkyl(meth)acrylate is not particularly limited as long as the alkyl(meth)acrylate includes an alkyl group with a carbon number of 1 to 12. Examples of the alkyl(meth)acrylate include those used in the acrylic polymer a1.

Among the alkyl(meth)acrylate, alkyl(meth)acrylate containing alkyl group with a carbon number of 4 to 12 is preferable and 2-ethylhexyl(meth)acrylates (2EHA), n-butyl (meth)acrylates (BA) are particularly preferable. The alkyl (meth)acrylate can be used alone or in combination of two or more kinds.

The acrylic polymer a2 includes alkyl(meth)acrylate as a monomer unit (a lower limit value) preferably in 85% by mass or more, more preferably 88% by mass or more, and further more preferably 90% by mass or more. The acrylic polymer a2 includes alkyl(meth)acrylate as a monomer unit (an upper limit value) preferably in 99% by mass or less.

In the acrylic polymer a2, the alkyl(meth)acrylate including 2EHA and BA has a ratio of BA to 2EHA (BA/2EHA, a mass ratio) is 2.0 to 3.0, for example.

Examples of the carboxyl group-containing monomer used in the acrylic polymer a1 are used in the acrylic polymer a2. The carboxyl group-containing monomer can be used alone or in combination of two or more kinds.

The carboxyl group-containing monomer is included in the acrylic polymer a2 as a monomer unit (a lower limit value) in preferably 1% by mass or more. The carboxyl group-containing monomer is included in the acrylic polymer a2 as a monomer unit (an upper limit value) in preferably 10% by mass or less, more preferably 8% by mass or less, and further more preferably 5% by mass or less.

Examples of the hydroxyl group-containing monomers used in the acrylic polymer a1 can be used in the acrylic polymer a2. The hydroxyl group-containing monomers can be used alone or in combination of two or more kinds. Among the above hydroxyl group-containing monomers, 4-hydroxybutyl acrylate (4HBA) is preferable.

The hydroxyl group-containing monomer is included in the acrylic polymer a2 as a monomer unit (a lower limit value) preferably in 0.01% by mass or more. The hydroxyl group-containing monomer is included in the acrylic polymer a2 as a monomer unit (an upper limit value) preferably in 1% by mass or less, more preferably 0.5% by mass or less, and further more preferably 0.1% by mass or less.

Examples of other copolymerizable monomers used in the acrylic polymer a1 are used in the acrylic monomer a2. Other copolymerizable monomers can be used alone or in combination of two or more kinds. The acrylic polymer a2 may include the other copolymerizable monomers as a monomer unit in 5% by mass or less.

The acrylic polymer a2 is included in the adhesive base polymer of the second acrylic adhesive layer (a lower limit value) preferably in 50% by mass or more, more preferably 70% by mass or more, and further more preferably 90% by mass or more. The acrylic polymer a2 is included in the adhesive base polymer of the second acrylic adhesive layer (an upper limit value) preferably in 100% by mass or less.

Other base polymer than the acrylic polymer a2 may be used as the base polymer in the second acrylic adhesive layer as long as the object of the present invention is achieved.

The acrylic polymer a2 can be produced by a known polymerization method like the acrylic polymer a1. Examples of the polymerization method include solution polymerization, emulsion polymerization, mass polymerization, and photopolymerization.

A polymerization initiator, a chain transfer agent, and polymerization solvent used in the polymerization of the acrylic polymer a2 are not particularly limited but may be selected from the known materials (such as those used in the polymerization of the acrylic polymer a1).

The weight-average molecular weight (Mw) of the acrylic polymers a2 is not particularly limited but a lower limit value of the weight-average molecular weight (Mw) is preferably 300,000 or more, and more preferably 350,000 or more, and further more preferably 400,000 or more from a viewpoint of a coating property of the solution containing the acrylic polymer a2. An upper limit value of the weight-average molecular weight (Mw) is preferably 2,000,000 or less, and more preferably 1,900,000 or less, and further more preferably 1,800,000 or less. The above weight-average molecular weight of the acrylic polymer a2 can be controlled by changing and adjusting types and amounts of the polymerization initiators, and polymerizing conditions such as temperature and duration of polymerization process. The weight-average molecular weight (Mw) of the acrylic polymer a2 is measured by gel permeation chromatography (GPC).

The second acrylic adhesive layer may contain tackifier resin as a component other than the base polymer such as the acrylic polymer a2. Examples of the tackifier resin used in the acrylic polymer a1 may be used. The tackifier resin can be used alone or in combination of two or more kinds.

The content amount (a lower limit value) of the tackifier resin is preferably 3 parts by mass or more, more preferably 5 parts by mass or more based on 100 parts by mass of the solid content of the adhesive base polymer (such as acrylic polymer a2) in the adhesive agent composition for forming the second acrylic adhesive layer. The content amount (an upper limit value) of the tackifier resin is preferably 50 parts by mass or less, more preferably 40 parts by mass or less based on 100 parts by mass of the solid content of the adhesive base polymer (such as acrylic polymer a2) in the adhesive agent composition for forming the second acrylic adhesive layer. The second acrylic adhesive layer containing the tackifier resin within such a range has effective adhesive force.

Examples of the crosslinking agents used in first acrylic adhesive layer can be used in the second acrylic adhesive layer. The crosslinking agents can be used in alone or in combination of two or more kinds.

The amount (a lower limit value) of the crosslinking agents is not particularly limited by and may be preferably 0.1 parts by mass or more based on 100 parts by mass of the solid content of the adhesive base polymer (such as acrylic polymer a2) in the adhesive composition for forming the second acrylic adhesive layer. The amount (an upper limit value) of the cross-linking agents is not particularly limited but is preferably 4 parts by mass or less, more preferably 3.5 parts by mass or less, further more preferably 3.0 parts by mass or less, and particularly preferably 2.0 parts by mass or less based on 100 parts by mass of the solid content of the adhesive base polymer (such as acrylic polymer a2) in the adhesive composition for forming the second acrylic adhesive layer. The second acrylic adhesive layer containing the crosslinking agent within such a range has effective adhesive force, a good hand tearing property, and a good peeling property.

The second acrylic adhesive layer may include known additives as necessary as long as the object of the present invention can be achieved. Known additives such as age inhibitors, colorants (such as pigments and dyes), ultraviolet ray absorbing agents, antioxidants, plasticizing agents, softeners, surfactants, and fillers may be included in the second acrylic adhesive layer similarly to the first acrylic adhesive layer.

The composition such as the adhesive base polymer for forming the second acrylic adhesive layer may be used as a solution having viscosity that is adjusted as appropriate by general solvents. Examples of the solvents used in the first acrylic adhesive layer may be used in the second acrylic adhesive layer. The solvents can be used alone or in combination of two or more kinds.

(Gel Fraction X2 of Second Acrylic Adhesive Layer)

A lower limit value of the gel fraction (ratio of solvent-insoluble components) X2 of the second acrylic adhesive layer is preferably 20 mass % or more. An upper limit value of the gel fraction (ratio of solvent-insoluble components) X2 is preferably 75 mass % or less, and more preferably 70 mass % or less. The second acrylic adhesive layer having the gel fraction (the upper limit value and lower limit value) of such a range has a good peeling property (adhesive residual property), a good hand tearing property, and effective adhesive force. A method of measuring gel fraction will be described later.

(Thickness t2 of Second Acrylic Adhesive Layer)

A thickness of the second acrylic adhesive layer (a lower limit value) is greater than 50 μm. An upper limit value of the thickness of the second acrylic adhesive layer is not particularly limited as long as the hand tearing property can be ensured, and is 100 μm or less. The hand-tearable double-sided pressure-sensitive tape having the thickness of the second acrylic adhesive layer within such a range can be adhered to a flat surface and an uneven surface of an adherend.

(Relation Between Thickness t1 and Thickness t2)

Thickness t2 of the second acrylic adhesive layer is greater than thickness t1 of the first acrylic adhesive layer. The adhesive force of the second acrylic adhesive layer is greater than the adhesive force of the first acrylic adhesive layer by setting the thickness t2 greater than the thickness t1. The adhesive force of the second acrylic adhesive layer may be set greater than the adhesive force of the first acrylic adhesive layer by lowering the gel permeation X2 of the second acrylic adhesive layer. However, if the gel permeation X2 is too low, a part of the adhesive agent remains on the adherend in removing. Therefore, it is not good to lower the gel permeation X2.

If the ratio of the thickness t1 and the thickness t2 (t1/t2) is 0.6 or less, difference between the adhesive force of the first acrylic adhesive layer (180° peel adhesion strength with respect to SUS) and the adhesive force of the second acrylic adhesive layer (180° peel adhesion strength with respect to SUS) is 15N/25 mm or more.

(Release Liner)

The hand-tearable double-sided pressure-sensitive tape may include a release liner that protects the adhesive surfaces of the first acrylic adhesive layer and the second acrylic adhesive layer before being used. The release liner is not particularly limited but may be selected from known release liners as appropriate as long as the hand tearing property of the hand-tearable double-sided pressure-sensitive tape are maintained.

Examples of the release liner include a base member including a release layer such as a plastic film and a paper sheet subjected to a surface treatment using a release agent such as silicone, long-chain alkyl, fluorine, molybdenum sulfide release agents; a low-adhesive base member including fluorinated polymers such as polytetrafluoroethylene, polychlorotrifuruoroethylene, polyvinyl fluoride, polyvinylidene fluoride, tetrafluoroethylene hexafluoropropylene copolymers, chlorofluoroethylene vinylidene fluoride copolymers; and a low-adhesive base member including non-polar polymers such as olefin resins (e.g., polyethylene, polypropylene). The release liner including a film layer made of paper is preferred because the hand tearing property is good.

Thickness (a lower limit value) of the release liner is 25 μm or more, preferably 38 μm or more. Thickness (an upper limit value) is 300 μm or less, preferably 200 μm or less. The double-sided pressure-sensitive tape including the release liner having the thickness within such a range has the adhesive surfaces of the first acrylic adhesive layer and the second acrylic adhesive layer being protected without adversely affecting the hand tearing property.

(Method of Forming First Acrylic Adhesive Layer and Second Acrylic Adhesive Layer)

The method of forming each of the adhesive layers of the hand-tearable double-sided pressure-sensitive adhesive tape is not particularly limited but may be a method as follows. For example, the adhesive composition for forming each adhesive layer is coated on the support base member or the release liner and dried and/or cured as necessary.

In the method of forming each adhesive layer, the adhesive composition may be applied by known coating methods using coaters such as a gravure coater, a reverse coater, a kiss roll coater, a dip roll coater, a bar coater, a knife coater, a spray coater, a comma coater, and a direct coater.

(Form of Hand-Tearable Double-Sided Pressure-Adhesive Tape)

The hand-tearable double-sided pressure-adhesive tape may have a form of a general double-sided pressure-sensitive tape. For example, it may be spread over a planar shape (including a belt-like shape) or may have a rolled form.

The hand-tearable double-sided pressure-adhesive tape may include other layers (such as an intermediate layer, and an undercoat) in addition to the support base member, the first acrylic adhesive layer and the second acrylic adhesive layer as long as the object of the present invention can be achieved.

(Use)

The hand-tearable double-sided pressure-adhesive tape includes two adhesive layers each having different adhesive force (the first acrylic adhesive layer and the second acrylic adhesive layer) and has an excellent hand tearing property, a good peeling property (adhesive residual property: no adhesive remains on the adherend after the peeling). Therefore, the hand-tearable double-sided pressure-adhesive tape is preferably used in a construction site (for example, newly built construction site, reforming site) for curing, packing, or connection of curing members.

Other than the construction site, the hand-tearable double-sided pressure-adhesive tapes are preferably used in the working sites that require a good hand tearing property. The hand tearing property is evaluated by a hand tearing property test, which will be described later.

Each of the adhesive layers (the first acrylic adhesive layer and the second acrylic adhesive layer) of the hand-tearable double-sided pressure-adhesive tape can be adhered to adherend made of various materials such as metal, wood, and plastic.

For example, in a curing process that an object to be covered (an object to be protected) such as a floor or walls is covered with a curing member made of a plastic cardboard or a plastic sheet, the hand-tearable double-sided pressure-adhesive tape is used. In such a case, the hand-tearable double-sided pressure-adhesive tape is adhered to the object to be covered such that the first acrylic adhesive layer is adhered to the object first. Then, the curing member is disposed on the object to be covered where the hand-tearable double-sided pressure-adhesive tape is adhered such that the curing member is adhered to the second acrylic adhesive layer. As a result, the object to be covered is covered with the curing member such that the first acrylic adhesive layer having low adhesive force is adhered to the object to be covered and the second acrylic adhesive layer having great adhesive force is adhered to the curing member.

After the curing process, if the curing member is removed from the object to be covered, the hand-tearable double-sided pressure-adhesive tape remains on the curing member side. The first acrylic adhesive layer can be removed from the object to be covered without any adhesive residual. The second acrylic adhesive layer remaining on the curing member side can be removed from the curing member without any adhesive residual.

The peeling property (adhesive residual property) of the hand-tearable double-sided pressure-adhesive tape will be evaluated by a method described later. The adhesive force of the hand-tearable double-sided pressure-adhesive tape is evaluated by measuring the 180° peel adhesion strength, which will be described later. Difference between the adhesive force of the first acrylic adhesive layer (with respect to SUS) and the adhesive force of the second acrylic adhesive layer (with respect to SUS) is preferably 5N/25 mm or more.

(Distinguishing of Adhesive Layer)

To easily distinguish the first acrylic adhesive layer having low adhesive force and the second acrylic adhesive layer having great adhesive force in the hand-tearable double-sided pressure-adhesive tape, identification information such as characters or symbols may be provided with printing on the release liner for protecting the first acrylic adhesive layer and a release liner for protecting the second acrylic adhesive layer, respectively, to distinguish them. Different color may be applied to each of the release liners to distinguish the first acrylic adhesive layer and the second acrylic adhesive layer.

To distinguish the first acrylic adhesive layer and the second acrylic adhesive layer, different colors may be applied to the first acrylic adhesive layer and the second acrylic adhesive layer with coloring agents such as pigment or identification information such as characters or symbols may be printed directly on the first acrylic adhesive layer and the second acrylic adhesive layer.

To distinguish the first acrylic adhesive layer and the second acrylic adhesive layer, different colors may be applied to the respective two surfaces of the support base member.

The present technology will be described more in detail with reference to Embodiments. The present technology is not limited by the embodiments.

<Preparation of Acrylic Polymer Solution>

[Acrylic Polymer Solution (A1)]

100 parts by mass of butyl acrylate (BA), 5 parts by mass of vinyl acetate (VAc), 0.1 parts by mass of 2-hydroxyethyl acrylate (HEA), 3 parts by mass of acrylic acid (AA), 0.2 parts by mass of AIBN (2,2'-azobisisobutyronitrile) (polymerization initiator), and 150 parts by mass of toluene were put in a reaction vessel having a cooling tube, a nitrogen introducing pipe, a thermometer, and an agitator, and agitated for one hour with nitrogen gas being introduced. Then, the resultant object was polymerized for seven hours at a temperature of 63° and acrylic polymer solution (A1) was obtained.

[Acrylic Polymer Solution (A2)]

70 parts by mass of butyl acrylate (BA), 30 parts by mass of 2-ethylhexyl acrylate (2EHA), 3 parts by mass of acrylic acid (AA), 0.05 parts by mass of 4-hydroxybutyl acrylate (4HBA), 0.1 parts by mass of AIBN (2,2'-azobisisobutyronitrile) (polymerization initiator), and 150 parts by mass of toluene were put in a reaction vessel having a cooling tube, a nitrogen introducing pipe, a thermometer, and an agitator, and agitated for one hour with nitrogen gas being introduced. Then, the resultant object was polymerized for seven hours at a temperature of 63° and acrylic polymer solution (A2) was obtained.

Monomer ratios of the acrylic polymer (a1) contained in the acrylic polymer solution (A1) and the acrylic polymer (a2) contained in the acrylic polymer solution (A2) are described in Table 1.

TABLE 1

| | MONOMER | | | | | |
| --- | --- | --- | --- | --- | --- | --- |
| | 2EHA | BA | VAc | HEA | 4-HBA | AA |
| ACRYLIC POLYMER a1 | | 100 | 5 | 0.1 | | 3 |
| ACRYLIC POLYMER a2 | 30 | 70 | | | 0.05 | 3 |

<Preparation of Adhesive Composition Solution>

[Acrylic Adhesive Composition Solution (B1)]

5 parts by mass of the tackifier (the trade name PENSEL D-125 available from Arakawa Chemical Industries, LTD., polymerized rosin ester, softening temperature 125° C.) in terms of solid content was mixed with 100 parts by mass of the acrylic polymer (a1) in terms of solid content and 2 parts by mass of isocyanate crosslinking agent (the trade name CORONATE L available from Nippon Polyurethane Industry Co., Ltd.) was added thereto and the acrylic adhesive composition solution (B1) was prepared.

[Acrylic Adhesive Composition Solution (B2)]

30 parts by mass of the tackifier (the trade name PENSEL D-125 available from Arakawa Chemical Industries, LTD., polymerized rosin ester, softening temperature 125° C.) in terms of solid content was mixed with 100 parts by mass of the acrylic polymer (a2) in terms of solid content and 2 parts by mass of isocyanate crosslinking agent (the trade name CORONATE L available from Nippon Polyurethane Industry Co., Ltd.) was added thereto and the acrylic adhesive composition solution (B2) was prepared.

[Acrylic Adhesive Composition Solution (B3)]

25 parts by mass of the tackifier (the trade name HARI-TACK PCJ available from Harima Chemicals Inc., polymerized rosin ester, softening temperature 123° C.) in terms of solid content and 15 parts by mass of the tackifier (the trade name SUMILITE RESIN PR-12603N available from SUMITOMO BAKELITE CO., LTD. terpene modified phenol) were mixed with 100 parts by mass of the acrylic polymer (A1) in terms of solid content and 2 parts by mass of isocyanate crosslinking agent (the trade name CORONATE L available from Nippon Polyurethane Industry Co., Ltd.) was added thereto and the acrylic adhesive composition solution (B3) was prepared.

[Acrylic Adhesive Composition Solution (B4)]

The acrylic adhesive composition solution (B4) was prepared in the similar method as that of the acrylic adhesive composition solution (B2) except for altering the amount of the isocyanate crosslinking agent to 0.1 parts by mass.

[Acrylic Adhesive Composition Solution (B5)]

The acrylic adhesive composition solution (B5) was prepared in the similar method as that of the acrylic adhesive composition solution (B1) except for altering the amount of the isocyanate crosslinking agent to 8 parts by mass.

The ratio of the components contained in the acrylic adhesive composition solutions (B1) to (B5) are described in Table 2.

SHINKO CHEMICAL INDUSTRIAL CO., LTD.) were put in a pressure kneader that was heated to 120° C. and mixed and heated for twenty minutes. Thus, a kneaded material was obtained. 115 parts by mass of the obtained kneaded material, and 40 parts by mass of petroleum resin, 15 parts by mass of calcium bicarbonate, 5 parts by mass of zinc oxide, and 5 parts by mass of softener (the trade name Nisseki Polybutene HV-300 available from JX Nippon Oil & Energy Corporation) were put in the pressure kneader and mixed and heated for seventeen minutes. Thus, the rubber adhesive composition solution (C1) was prepared.

<Preparation of Support Base Member>

[Support Base Member (D1)]

As pellet type polyethylene, 50 parts by mass of SUMI-KASEN G201-F (trade name) (available from Sumitomo Chemical Co. Ltd., low density polyethylene), and 50 parts by mass of HI-ZEX 2200J (trade name) (available from Mitsui Chemicals Inc., high density polyethylene) were mixed with 5.3 parts by mass of pigment (trade name, HCM NTD 181 pink available from Dainichiseika Color & Chemicals Mfg. Co., Ltd.) by dry blending and base member composition was obtained. Next, the obtained base member composition was molded into a film with extrusion molding by a T-die at a extrusion temperature of 220° C., and right after the extrusion, an embossing roll having an uneven surface was in contact with one surface of the obtained film and cooled down. After cooling down, the film was wound and a film having an uneven surface (having recessed portions) was obtained. Another surface of the film has no unevenness and is a flat and smooth surface.

TABLE 2

| | POLYMER | | TACKIFIER | | | CROSSLINKING AGENT |
|---|---|---|---|---|---|---|
| | ACRYLIC POLYMER a1 | ACRYLIC POLYMER a2 | PENSEL D-125 | HARITACK PCJ | SUMILITE RESIN PR-12603N | CORONATE L |
| ACRYLIC ADHESIVE COMPOSITION SOLUTION B1 | 100 | | 5 | | | 2 |
| ACRYLIC ADHESIVE COMPOSITION SOLUTION B2 | | 100 | 30 | | | 2 |
| ACRYLIC ADHESIVE COMPOSITION SOLUTION B3 | 100 | | | 25 | 15 | 2 |
| ACRYLIC ADHESIVE COMPOSITION SOLUTION B4 | | 100 | 30 | | | 0.1 |
| ACRYLIC ADHESIVE COMPOSITION SOLUTION B5 | 100 | | 5 | | | 8 |

[Rubber Adhesive Composition Solution (C1)]

100 parts by mass of natural rubber having a Mooney viscosity of 40 (ML1+4 (120° C.) that was adjusted by a Bunbury mixer, 50 parts by mass of petroleum resin (the trade name ESCOREZ 1201 available from Japan Chemical Trading Co., Ltd.), 120 parts by mass of calcium bicarbonate, 15 parts by mass of zinc oxide, 2.0 parts by mass of antioxidant (the trade name IRGANOX 1010 available from BASF Japan Ltd.), and 1.5 parts by mass of crosslinking agent (the trade name NOCCELER available from OUCHI The two surfaces of the film were subjected to corona treatment to improve anchoring property (adhesive property) with respect to the adhesive layer. Thus obtained film has a thickness of 90 μm and each recessed portion has a width of 190 μm to 210 μm, and a depth of 20 μm to 30 μm, and an interval (pitch) between adjacent recessed portions is 780 μm to 820 μm. Each recessed portion formed in the film has a substantially U-shaped cross sectional shape. Thus obtained film is the support base member (D1).

<Preparation of Double-Sided Adhesive Tape>

Example 1

A paper release liner 1 having a surface that was subjected to release treatment with silicone and has a thickness of 125 µm and a paper release liner 2 having a surface that was subjected to the release treatment with silicone and has a thickness of 105 µm were prepared.

The acrylic adhesive composition solution (B2) was coated over one surface of the release liner 2 that was subjected to the release treatment so that the thickness after the heating process is 55 µm. Then, the coated material on the release liner 2 was heated at 100° C. for three minutes and one acrylic adhesive layer (the second acrylic adhesive layer) having a thickness of 55 µm was formed. Next, the flat and smooth surface of the support substrate member (D1) was adhered to the adhesive layer.

The acrylic adhesive composition solution (B1) was coated over one surface of the release liner 1 that was subjected to the release treatment so that the thickness after the heating process is 15 Then, the coated material on the release liner 1 was heated at 100° C. for three minutes and another acrylic adhesive layer (the first acrylic adhesive layer) having a thickness of 15 µm was formed. Then, the acrylic adhesive layer was layered on and adhered to the other surface (the uneven surface) of the support base member (D1) and the release liner 2 was wound and the double-sided pressure-sensitive adhesive tape was obtained.

Example 2

A double-sided pressure-sensitive adhesive tape was prepared in the similar method as is in Example 1 except in that the acrylic adhesive composition solution (B2) was coated over one surface of the release liner 2 so that the thickness after the heating process is 60 µm, and the acrylic adhesive composition solution (B1) was coated over one surface of the release liner 1 so that the thickness after the heating process is 30 µm.

Example 3

A double-sided pressure-sensitive adhesive tape was prepared in the similar method as is in Example 2 except in that CARALYAN Y (the trade name available from DENKI KAGAKU KOGYO KABUSHIKI KAISHA, high density polyethylene/low density polyethylene blended transversely uniaxially stretched polyester film, thickness 25 µm) (hereinafter referred to as the support base member (D2)) was used as the support base member, and the acrylic adhesive composition solution (B3) was coated over one surface of the release liner 1 so that the thickness after the heating process is 15 µm.

Example 4

A double-sided pressure-sensitive adhesive tape was prepared in the similar method as is in Example 3 except in that the acrylic adhesive composition solution (B3) was coated over one surface of the release liner 1 so that the thickness after the heating process is 30 µm.

Example 5

A double-sided pressure-sensitive adhesive tape was prepared in the similar method as is in Example 2 except in that the acrylic adhesive composition solution (B1) was coated over one surface of the release liner 1 so that the thickness after the heating process is 45 µm.

Example 6

A double-sided pressure-sensitive adhesive tape was prepared in the similar method as is in Example 1 except in that the acrylic adhesive composition solution (B2) was coated over one surface of the release liner 2 so that the thickness after the heating process is 30 µm.

Comparative Example 1

A double-sided pressure-sensitive adhesive tape was prepared in the similar method as is in Example 2 except in that Lumirror S10 #25 (the trade name available from TORAY INDUSTRIES, INC., polyethylene terephthalate (PET) film, thickness 25 µm) (hereinafter, referred to as the support base member (D3)) was used as the support base member.

Comparative Example 2

A double-sided pressure-sensitive adhesive tape was prepared in the similar method as is in Example 2 except in that the rubber adhesive composition solution (C1) was coated over one surface of the release liner 2 so that the thickness after the heating process is 80 µm.

Comparative Example 3

A double-sided pressure-sensitive adhesive tape was prepared in the similar method as is in Example 3 except in that the acrylic adhesive composition solution (B4) was coated over one surface of the release liner 2 so that the thickness after the heating process is 60 µm.

Comparative Example 4

A double-sided pressure-sensitive adhesive tape was prepared in the similar method as is in Comparative Example 3 except in that the acrylic adhesive composition solution (B5) was coated over one surface of the release liner 2 so that the thickness after the heating process is 60 µm.

Comparative Example 5

A double-sided pressure-sensitive adhesive tape was prepared in the similar method as is in Example 2 except in that the acrylic adhesive composition solution (B1) was coated over one surface of the release liner 1 so that the thickness after the heating process is 60 µm.

Comparative Example 6

A double-sided pressure-sensitive adhesive tape was prepared in the similar method as is in Example 2 except in that the acrylic adhesive composition solution (B2) was coated over one surface of the release liner 2 so that the thickness after the heating process is 120 µm, and the acrylic adhesive composition solution (B1) was coated over one surface of the release liner 1 so that the thickness after the heating process is 120 µm.

Comparative Example 7

A double-sided pressure-sensitive adhesive tape was prepared in the similar method as is in Example 1 except in that the acrylic adhesive composition solution (B2) was coated over one surface of the release liner 2 so that the thickness after the heating process is 15 µm.

[Insoluble Solvent Ratio (Gel Fraction) of Acrylic Adhesive Layer]

The acrylic adhesive composition (B1 to B5) was coated over the release liner (the trade name, DIAFOIL MRF-38 available from Mitsubishi Plastics Inc.) such that the thickness after drying is 60 µm, and coated material was dried at 100° C. for three minutes, and thus an pressure-sensitive adhesive sheet was prepared.

The pressure-sensitive adhesive sheet was peeled off from the release liner and approximately 100 mg of only the adhesive layer was placed on a porous film made of tetrafluoroethylene having a hole diameter of 0.2 µm (trade name: NITOFLON NTF1122 available from NITTO DENKO CORPORATION) and wrapped like a drawstring pouch and the opening of the pouch was closed with a kite string. Then, a mass of the wrapped material was measured (Wb(mg)). The mass of each of the porous film and the kite string was previously measured (Wa(mg)).

The wrapped material was put in a screw type bottle and the screw type bottle was filled with ethyl acetate. The screw type bottle was left in a room temperature for seven days and then, the wrapped material was taken out of the screw type bottle and dried at 130° C. for two hours. Thereafter, the mass of the wrapped material was measured (Wc(mg)) and the gel fraction (mass %) was obtained with the following formula. The results are illustrated in Table 3.

Gel fraction (mass %)=($Wc-Wa$)/($Wb-Wa$)×100

<Evaluation 1>

[Adhesive Force (Peeling Strength) (with Respect to SUS)]

The double-sided pressure-sensitive adhesive tape obtained in each of Examples and Comparative Examples was cut into a piece of 25 mm width and 90 mm length, and adhered to a SUS 304 stainless plate, which is an adherend, at a room temperature (23° C.) and pressed with a roller of 2 kg by a set of back and forth movement. Then, the adherend with the adhesive tape was left in a room temperature (23° C.) for thirty minutes, and a peeling test was executed at a peeling speed of 300 mm/min and the adhesive force (N/25 mm) was measured. The results are illustrated in Table 3.

In Table 3, the first acrylic adhesive layers of Examples 1 to 6 and the adhesive layers of the corresponding Comparative Examples 1 to 7 are represented by the first adhesive layer and the adhesive surfaces are represented by a first surface. The second acrylic adhesive layers of Examples 1 to 6 and the adhesive layers of the corresponding Comparative Examples 1 to 6 are represented by a second adhesive layer and the adhesive surfaces are represented by a second surface.

<Evaluation 2>

[Adhesive Force (Peeling Strength) (with Respect to PP)]

The adhesive force (N/25 mm) of the double-sided pressure-sensitive tape obtained in each Example and each Comparative Example was measured in the same method as is in Evaluation 2 except in that polypropylene (PP) plate (trade name, PP-N-AN available from Shin-kobe Electric Machinery Co., Ltd.) was used as the adherend. The results are illustrated in Table 3.

<Evaluation 3>

[Adhesive Residual]

The double-sided pressure-sensitive adhesive tape obtained in each of Examples and Comparative Examples was cut into a piece of 50 mm width and 50 mm length, and adhered to a SUS 304 stainless plate, which is an adherend, at a room temperature (23° C.) and pressed with a roller of 2 kg. The plate with the adhesive tape was kept at 50° C. for forty eight hours and then, left in a room temperature (23° C.) for two hours. Then, the adherend from which the pressure-sensitive adhesive tape was peeled off with hands and was observed visually, and the adhesive residual property was evaluated with two steps according to the following evaluation standard. The results are illustrated in Table 3.

<Evaluation Standard for Adhesive Residual>

Good (◯): no adhesive residual was observed

Not good (x): adhesive residual was observed

<Evaluation 4>

[Hand Tearing Property]

The double-sided pressure-sensitive adhesive tape obtained in each of Examples and Comparative Examples was cut into a piece of 25 mm width and 90 mm length and left in a room temperature (23° C.) for two hours and the obtained material was used as a test sample. The release liner 1 was peeled off from the test sample in the room temperature (23° C.) and then, one edge portion of the test sample with respect to the width direction was held with fingertips of both hands such that the distance between the fingertips is 5 mm to 10 mm and the test sample was ready to be torn. Thereafter, the test sample was torn with both hands in the width direction and hand tearing property was sensually evaluated according to the following evaluation standard based on ease of tearing of the test sample. The release liner 2 was adhered on the adhesive surface of the other adhesive layer (the second acrylic adhesive layer) of the double-sided pressure-sensitive adhesive tape of each of Examples and Comparative Examples. The results are illustrated in Table 3.

<Evaluation Standard for Hand Tearing Property>

Good (◯): easily torn

Not good (x): not easily torn

TABLE 3

|  |  | EXAMPLES |  |  |  |  |  | COMPARATIVE EXAMPLES |  |  |  |  |  |  |
|---|---|---|---|---|---|---|---|---|---|---|---|---|---|---|
|  |  | 1 | 2 | 3 | 4 | 5 | 6 | 1 | 2 | 3 | 4 | 5 | 6 | 7 |
| SUPPORT BASE MEMBER | KIND | D1 | D1 | D2 | D2 | D1 | D1 | D3 | D1 | D2 | D2 | D1 | D1 | D1 |
|  | THICKNESS t0 (µm) | 90 | 90 | 25 | 25 | 90 | 90 | 25 | 90 | 25 | 25 | 90 | 90 | 90 |
| FIRST ADHESIVE LAYER | KIND | B1 | B1 | B3 | B3 | B1 | B1 | B1 | B1 | B3 | B3 | B1 | B1 | B1 |
| (FIRST SURFACE SIDE) | GEL FRACTION X1 (%) | 49 | 49 | 58 | 58 | 49 | 49 | 49 | 49 | 58 | 58 | 49 | 49 | 49 |
|  | THICKNESS t1 (µm) | 15 | 30 | 15 | 30 | 45 | 15 | 30 | 30 | 15 | 15 | 60 | 120 | 15 |
| SECOND ADHESIVE LAYER | KIND | B2 | B2 | B2 | B2 | B2 | B2 | B2 | C1 | B4 | B5 | B2 | B2 | B2 |
| (SECOND SURFACE SIDE) | GEL FRACTION X2 (%) | 22 | 22 | 22 | 22 | 22 | 22 | 22 | — | 4 | 71 | 22 | 22 | 22 |
|  | THICKNESS t2 (µm) | 55 | 60 | 60 | 60 | 60 | 30 | 60 | 80 | 60 | 60 | 60 | 120 | 15 |

TABLE 3-continued

| | | EXAMPLES | | | | | | COMPARATIVE EXAMPLES | | | | | | |
|---|---|---|---|---|---|---|---|---|---|---|---|---|---|---|
| | | 1 | 2 | 3 | 4 | 5 | 6 | 1 | 2 | 3 | 4 | 5 | 6 | 7 |
| 180° PEEL ADHESION STRENGTH (WITH RESPECT TO SUS)(N/25 mm) | FIRST SURFACE SIDE | 5 | 9 | 12 | 16 | 20 | 7 | 15 | 9 | 12 | 12 | 22 | 35 | 5 |
| | SECOND SURFACE SIDE | 27 | 30 | 36 | 36 | 30 | 23 | 35 | 18 | >50 | 7 | 30 | 46 | 9 |
| 180° PEEL ADHESION STRENGTH (WITH RESPECT TO PP)(N/25 mm) | FIRST SURFACE SIDE | 4 | 7 | 7 | 12 | 8 | 5 | 12 | 7 | 7 | 7 | 13 | 23 | 4 |
| | SECOND SURFACE SIDE | 8 | 9 | 15 | 15 | 9 | 7 | 18 | 19 | >50 | 5 | 9 | 26 | 3 |
| RELEASING PROPERTY (ADHESIVE RESIDUAL PROPERTY) (WITH RESPECT TO SUS) | FIRST SURFACE SIDE | ○ | ○ | ○ | ○ | ○ | ○ | ○ | ○ | ○ | ○ | ○ | ○ | ○ |
| | SECOND SURFACE SIDE | ○ | ○ | ○ | ○ | ○ | ○ | ○ | x | x | ○ | ○ | ○ | ○ |
| HAND TEARING PROPERTY | | ○ | ○ | ○ | ○ | ○ | ○ | x | ○ | ○ | ○ | x | x | ○ |

As illustrated in Table 3, it was confirmed that the double-sided pressure-sensitive adhesive tape of each of Examples 1 to 6 has good hand tearing property and good peeling property (adhesive residual property: no adhesive remains on the adherend after the peeling).

Among Examples 1 to 6, in Examples 1 to 4 and 6, the 180° peel adhesion strength with respect to SUS of the second acrylic adhesive layer is greater than that of the first acrylic adhesive layer by 15N/25 mm or more, and it was confirmed that the adhesive force of the first acrylic adhesive layer and that of the second acrylic adhesive layer are clearly different.

If the 180° peel adhesion strength with respect to PP of the second acrylic adhesive layer is 7N/25 mm or less, the double-sided pressure-sensitive adhesive tape may be peeled off from the adherend on the side of the adhesive surface of the second acrylic adhesive layer during the curing according to the weight of the adherend (for example, a curing member) where the second acrylic adhesive layer is adhered and use environment (for example, high-temperature and high-humidity environment). For example, if the curing member made of plastic (PP) cardboard is adhered to a corner of walls with using the double-sided pressure-sensitive adhesive tape, the curing member is bent along the corner of the walls. If the adhesive force of the second acrylic adhesive layer of the double-sided pressure-sensitive adhesive tape is 7N/25 mm or less, the double-sided pressure-sensitive adhesive tape may be peeled off from the adhesive surface of the second acrylic adhesive layer due to the reaction force (restoring force) of the curing member.

In Comparative Example 1, the support base member has no hand tearing property. Therefore, it was confirmed that the double-sided pressure-sensitive adhesive tape as a whole has no hand tearing property.

In Comparative Example 2, the rubber adhesive layer was used as the adhesive layer having great adhesive force and it was confirmed that a part of the adhesive layer remains on the adherend after the rubber adhesive layer was peeled off from the adherend.

In Comparative Example 3, the gel fraction of the second adhesive layer is 4 mass % and it was confirmed that a part of the adhesive layer remains on the adherend after the second adhesive layer was peeled off from the adherend.

In Comparative Example 4, the gel fraction of the second adhesive layer is 71 mass % and it was confirmed that the adhesive force of the second adhesive layer was smaller than the adhesive force of the first adhesive layer. In Comparative Example 4, the adhesive force of the first adhesive layer is greater than the adhesive force of the second adhesive layer. However, the first adhesive layer does not provide effective adhesive force with respect to the adherend having an uneven surface.

In Comparative Example 5, the first adhesive layer has a thickness of 60 μm and it was confirmed that the double-sided pressure-sensitive adhesive tape cannot ensure good hand tearing property.

In Comparative Example 6, the first adhesive layer has a thickness of 120 μm and it was confirmed that the double-sided pressure-sensitive adhesive tape cannot ensure good hand tearing property.

In Comparative Example 7, the second adhesive layer has a thickness of 15 μm and it was confirmed that the second adhesive layer cannot have effective adhesive force.

EXPLANATION OF SYMBOLS

10: hand-tearable double-sided pressure-sensitive adhesive tape, 11: support base member, 11*a*: recessed portion, 11A, 11B: resin film having recessed portions, 21: first acrylic adhesive layer, 21A: low adhesive force surface, 22: second acrylic adhesive layer, 22B: great adhesive force surface

The invention claimed is:
1. A double-sided pressure-sensitive adhesive tape comprising:
 a support base member having a hand tearable property;
 a first acrylic adhesive layer on a side of one surface of the support base member; and
 a second acrylic adhesive layer on a side of another surface of the support base member, wherein
 the first acrylic adhesive layer has a thickness t1 that is 5 μm or more and 50 μm or less,
 the second acrylic adhesive layer has a thickness t2 that is greater than the thickness t1 of the first acrylic adhesive layer and is 20 μm or more,
 the second acrylic adhesive layer has a gel fraction X2 that is 20 mass % or more and 75 mass % or less,
 the second acrylic adhesive layer has an adhesive force greater than an adhesive force of the first acrylic adhesive layer, and
 the first acrylic adhesive layer has a gel fraction X1 that is greater than the gel fraction X2 of the second acrylic adhesive layer.
2. The double-sided pressure-sensitive adhesive tape according to claim 1, wherein the support base member has a thickness t0 that is 10 μm or more and 150 μm or less.
3. The double-sided pressure-sensitive adhesive tape according to claim 1, wherein the support base member is made of a polyolefin resin film.

4. The double-sided pressure-sensitive adhesive tape according to claim 1, wherein the thickness t2 of the second acrylic adhesive layer is 50 μm or more.

5. A double-sided pressure-sensitive adhesive tape comprising:
 a support base member having a hand tearable property;
 a first acrylic adhesive layer on a side of one surface of the support base member; and
 a second acrylic adhesive layer on a side of another surface of the support base member, wherein
 the first acrylic adhesive layer has a thickness t1 that is 5 μm or more and 50 μm or less,
 the second acrylic adhesive layer has a thickness t2 that is greater than the thickness t1 of the first acrylic adhesive layer and is 20 μm or more,
 the second acrylic adhesive layer has a gel fraction X2 that is 20 mass % or more and 75 mass % or less,
 the second acrylic adhesive layer has an adhesive force greater than an adhesive force of the first acrylic adhesive layer, and
 the support base member has a thickness t0 that is 10 μm or more and 150 μm or less.

6. The double-sided pressure-sensitive adhesive tape according to claim 5, wherein the thickness t2 of the second acrylic adhesive layer is 50 μm or more.

7. The double-sided pressure-sensitive adhesive tape according to claim 5 being used for a curing member for construction.

8. The double-sided pressure-sensitive adhesive tape according to claim 7, wherein the acrylic adhesive layer is adhered to an object to be covered and the second acrylic adhesive layer is adhered to the curing member that covers the object to be covered.

9. The double-sided pressure-sensitive adhesive tape according to claim 5, wherein the support base member is made of a polyolefin resin film.

10. A double-sided pressure-sensitive adhesive tape comprising:
 a support base member having a hand tearable property;
 a first acrylic adhesive layer on a side of one surface of the support base member; and
 a second acrylic adhesive layer on a side of another surface of the support base member, wherein
 the first acrylic adhesive layer has a thickness t1 that is 5 μm or more and 50 μm or less,
 the second acrylic adhesive layer has a thickness t2 that is greater than the thickness t1 of the first acrylic adhesive layer and is 20 μm or more,
 the second acrylic adhesive layer has a gel fraction X2 that is 20 mass % or more and 75 mass % or less,
 the second acrylic adhesive layer has an adhesive force greater than an adhesive force of the first acrylic adhesive layer,
 the support base member is made of a polyolefin resin film, and
 the support base member contains high density polyethylene and low density polyethylene as a composition of the polyolefin resin film.

11. The double-sided pressure-sensitive adhesive tape according to claim 10, wherein the support base member is made of a uniaxially stretched type resin film or a resin film including a weak portion that is a tearing start portion.

12. A double-sided pressure-sensitive adhesive tape comprising:
 a support base member having a hand tearable property;
 a first acrylic adhesive layer on a side of one surface of the support base member; and
 a second acrylic adhesive layer on a side of another surface of the support base member, wherein
 the first acrylic adhesive layer has a thickness t1 that is 5 μm or more and 50 μm or less,
 the second acrylic adhesive layer has a thickness t2 that is greater than the thickness t1 of the first acrylic adhesive layer and is 20 μm or more,
 the second acrylic adhesive layer has a gel fraction X2 that is 20 mass % or more and 75 mass % or less,
 the second acrylic adhesive layer has an adhesive force greater than an adhesive force of the first acrylic adhesive layer,
 the support base member is made of a polyolefin resin film, and
 the support base member is made of a uniaxially stretched type resin film or a resin film including a weak portion that is a tearing start portion.

13. The double-sided pressure-sensitive adhesive tape according to claim 12, wherein the support base member includes a recessed portion on at least one surface thereof as the weak portion.

14. A double-sided pressure-sensitive adhesive tape comprising:
 a support base member having a hand tearable property;
 a first acrylic adhesive layer on a side of one surface of the support base member; and
 a second acrylic adhesive layer on a side of another surface of the support base member, wherein
 the first acrylic adhesive layer has a thickness t1 that is 5 μm or more and 50 μm or less,
 the second acrylic adhesive layer has a thickness t2 that is greater than the thickness t1 of the first acrylic adhesive layer and is 20 μm or more,
 the second acrylic adhesive layer has a gel fraction X2 that is 20 mass % or more and 75 mass % or less,
 the second acrylic adhesive layer has an adhesive force greater than an adhesive force of the first acrylic adhesive layer,
 the first acrylic adhesive layer has a gel fraction X1 that is 35 mass % or more and 90 mass % or less, and
 the gel fraction X1 of the first acrylic adhesive layer is greater than the gel fraction X2 of the second acrylic adhesive layer.

15. A double-sided pressure-sensitive adhesive tape comprising:
 a support base member having a hand tearable property;
 a first acrylic adhesive layer on a side of one surface of the support base member; and
 a second acrylic adhesive layer on a side of another surface of the support base member, wherein
 the first acrylic adhesive layer has a thickness t1 that is 5 μm or more and 50 μm or less,
 the second acrylic adhesive layer has a thickness t2 that is greater than the thickness t1 of the first acrylic adhesive layer and is 20 μm or more,
 the second acrylic adhesive layer has a gel fraction X2 that is 20 mass % or more and 75 mass % or less,
 the second acrylic adhesive layer has an adhesive force greater than an adhesive force of the first acrylic adhesive layer,
 the first acrylic adhesive layer has a gel fraction X1 that is 35 mass % or more and 90 mass % or less, and
 the support base member has a thickness t0 that is 10 μm or more and 150 μm or less.

16. A double-sided pressure-sensitive adhesive tape comprising:
- a support base member having a hand tearable property;
- a first acrylic adhesive layer on a side of one surface of the support base member; and
- a second acrylic adhesive layer on a side of another surface of the support base member, wherein
- the first acrylic adhesive layer has a thickness t1 that is 5 µm or more and 50 µm or less,
- the second acrylic adhesive layer has a thickness t2 that is greater than the thickness t1 of the first acrylic adhesive layer and is 20 µm or more,
- the second acrylic adhesive layer has a gel fraction X2 that is 20 mass % or more and 75 mass % or less,
- the second acrylic adhesive layer has an adhesive force greater than an adhesive force of the first acrylic adhesive layer,
- the first acrylic adhesive layer has a gel fraction X1 that is 35 mass % or more and 90 mass % or less, and
- the support base member is made of a polyolefin resin film.

17. A double-sided pressure-sensitive adhesive tape comprising:
- a support base member having a hand tearable property;
- a first acrylic adhesive layer on a side of one surface of the support base member; and
- a second acrylic adhesive layer on a side of another surface of the support base member, wherein
- the first acrylic adhesive layer has a thickness t1 that is 5 µm or more and 50 µm or less,
- the second acrylic adhesive layer has a thickness t2 that is greater than the thickness t1 of the first acrylic adhesive layer and is 20 µm or more,
- the second acrylic adhesive layer has a gel fraction X2 that is 20 mass % or more and 75 mass % or less,
- the second acrylic adhesive layer has an adhesive force greater than an adhesive force of the first acrylic adhesive layer,
- the first acrylic adhesive layer has a gel fraction X1 that is 35 mass % or more and 90 mass % or less, and
- the thickness t2 of the second acrylic adhesive layer is 50 µm or more.

* * * * *